(12) United States Patent
Hajduch

(10) Patent No.: US 8,123,508 B2
(45) Date of Patent: *Feb. 28, 2012

(54) VENTING VALVE TO BE USED IN VENTING BORES OF VULCANIZATION MOLDS

(75) Inventor: Jaroslav Hajduch, Bytca (SK)

(73) Assignee: Glebus Alloys Europe, s.r.o. (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,950

(22) Filed: Dec. 21, 2009

(65) Prior Publication Data

US 2010/0166900 A1    Jul. 1, 2010

Related U.S. Application Data

(63) Continuation of application No. 12/281,606, filed as application No. PCT/SK2007/050007 on Feb. 26, 2007, now Pat. No. 7,645,131.

(30) Foreign Application Priority Data

Mar. 3, 2006  (SK) .................................. 0044-2006

(51) Int. Cl.
B29C 33/10  (2006.01)
(52) U.S. Cl. ........ 425/28.1; 249/141; 425/472; 425/812
(58) Field of Classification Search .................. 425/28.1, 425/472, 812; 249/141
See application file for complete search history.

(56) References Cited

U.S. PATENT DOCUMENTS

| 4,351,789 A | 9/1982 | Sidles et al. |
| 4,492,554 A | 1/1985 | Carter |
| 5,922,237 A | 7/1999 | Green |
| 5,939,101 A | 8/1999 | Green |
| 6,871,831 B1 | 3/2005 | Cuny et al. |
| 6,923,629 B2 | 8/2005 | Ahn et al. |
| 7,645,131 B2 | 1/2010 | Hajdúch |

FOREIGN PATENT DOCUMENTS

AU        710458        5/1997

(Continued)

OTHER PUBLICATIONS

International Written Opinion—Form PCT/ISA/237, dated Aug. 18, 2008.

(Continued)

*Primary Examiner* — James Mackey
(74) *Attorney, Agent, or Firm* — Hahn Loeser & Parks LLP; Bret A. Hrivnak, Esq.

(57) ABSTRACT

Vent valve for venting bores of vulcanization moulds, especially for the tread profile area, consisting of a valve sleeve, in which a valve insert and a wound spring are movably located, wherein the valve insert consists of a valve shank, which is at one end equipped with a disk and at the other end with a conical surface changing into backwards oriented conical end, and the movement of the valve insert is controlled by a delimiter of opening the valve. Inner surface of the valve sleeve is in its part located further away from disk provided with conical surface, oriented away from the disk, and the delimiter of opening the valve is formed by two mutually cooperating conical surfaces or parts of conical surfaces, wherein the conical surface formed at the end of the valve shank of the valve insert is oriented against the conical surface or part of conical surface of the valve sleeve.

17 Claims, 6 Drawing Sheets

FOREIGN PATENT DOCUMENTS

| | | |
|---|---|---|
| DE | 19543276 C1 | 2/1997 |
| EP | 0774333 B1 | 11/1996 |
| EP | 1380397 A2 | 1/2004 |
| GB | 922788 | 4/1963 |
| GB | 2339163 A | 1/2000 |

OTHER PUBLICATIONS

International Search Report—Form PCT/ISA/210, dated Aug. 18, 2008.

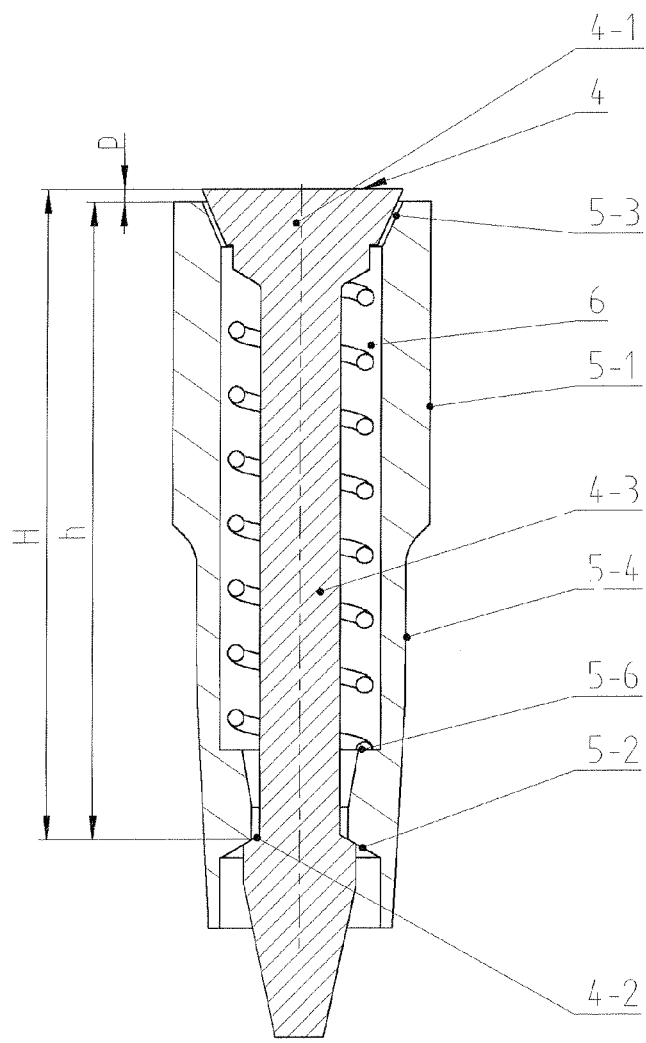 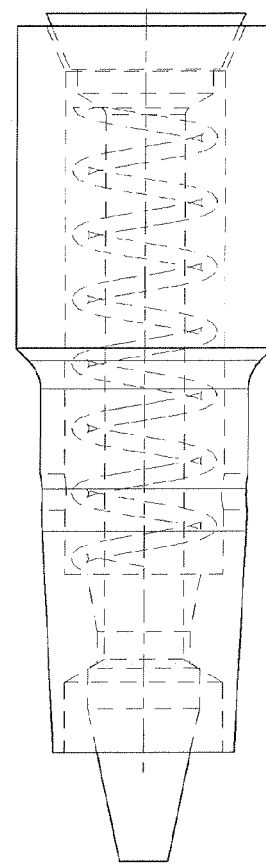
Fig. 1.1      Fig. 1.2

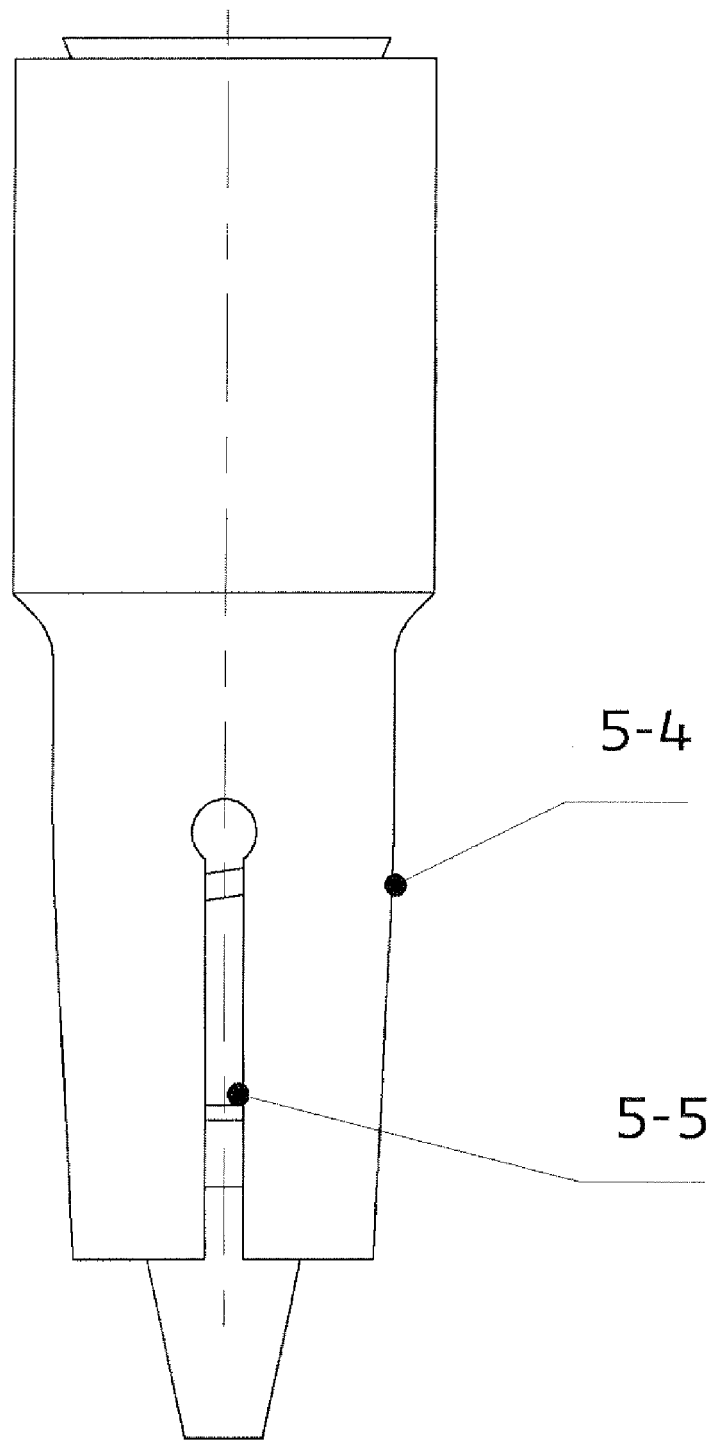
Fig. 1.3

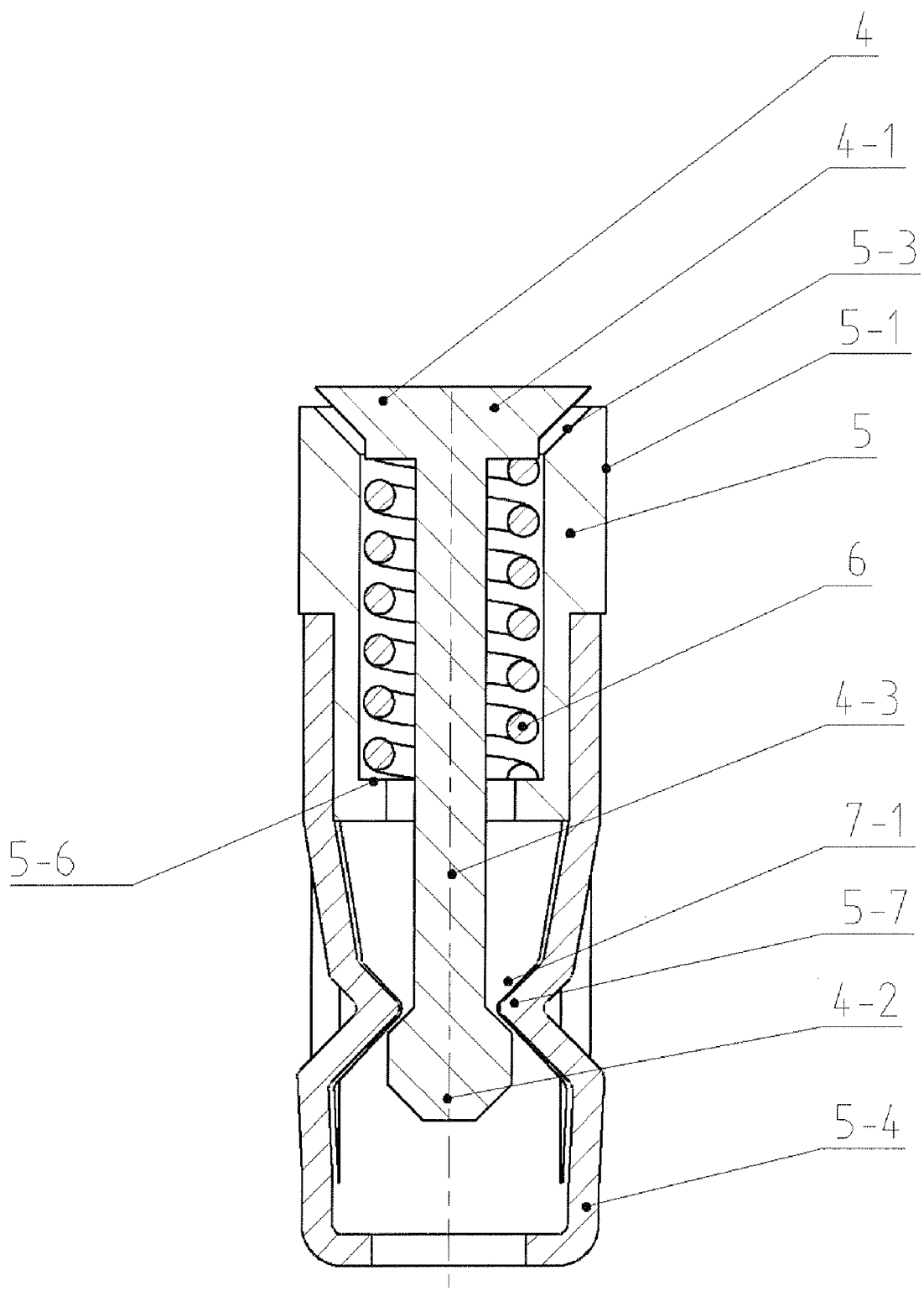
Fig. 2.1

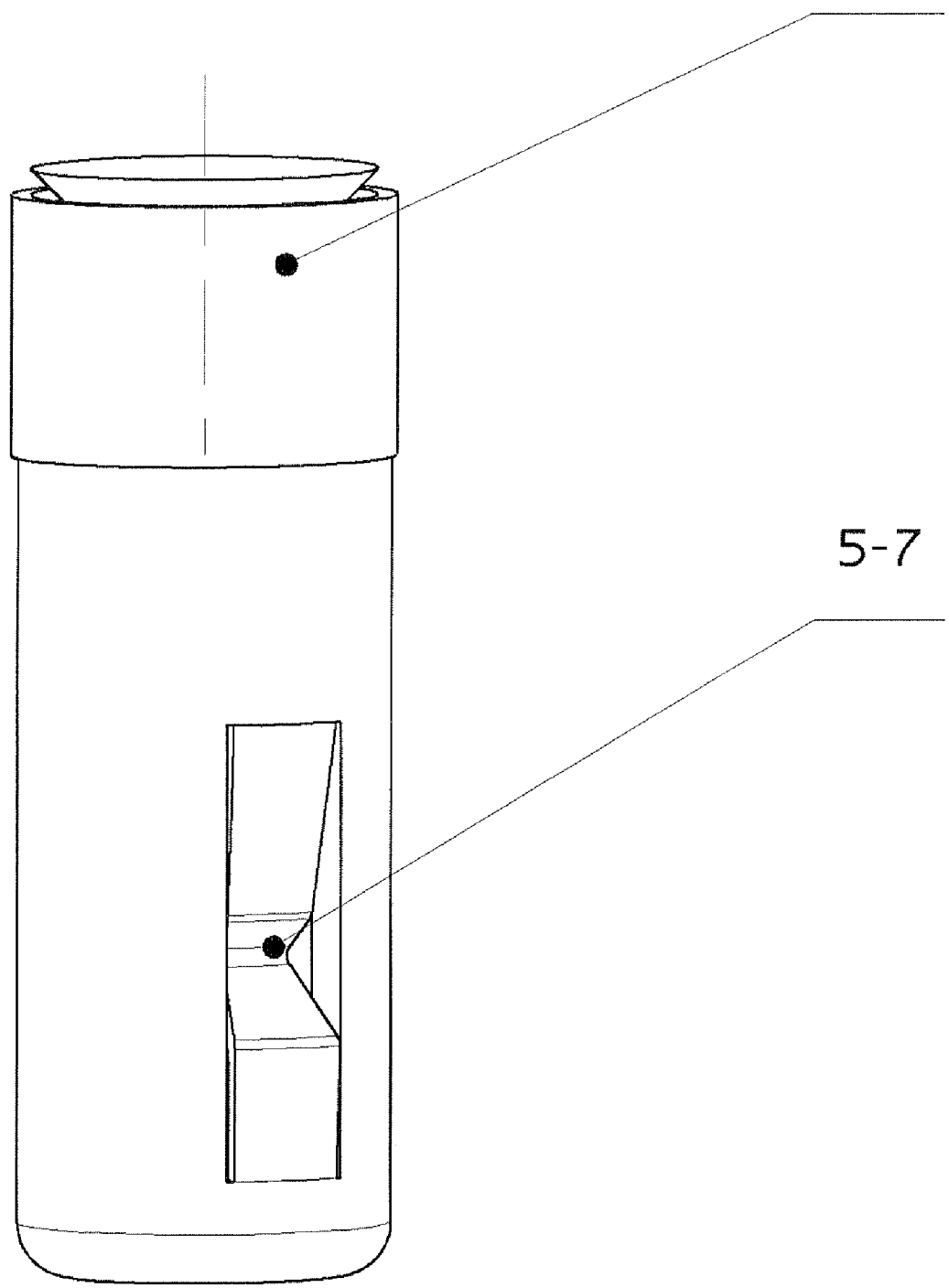
Fig. 2.2

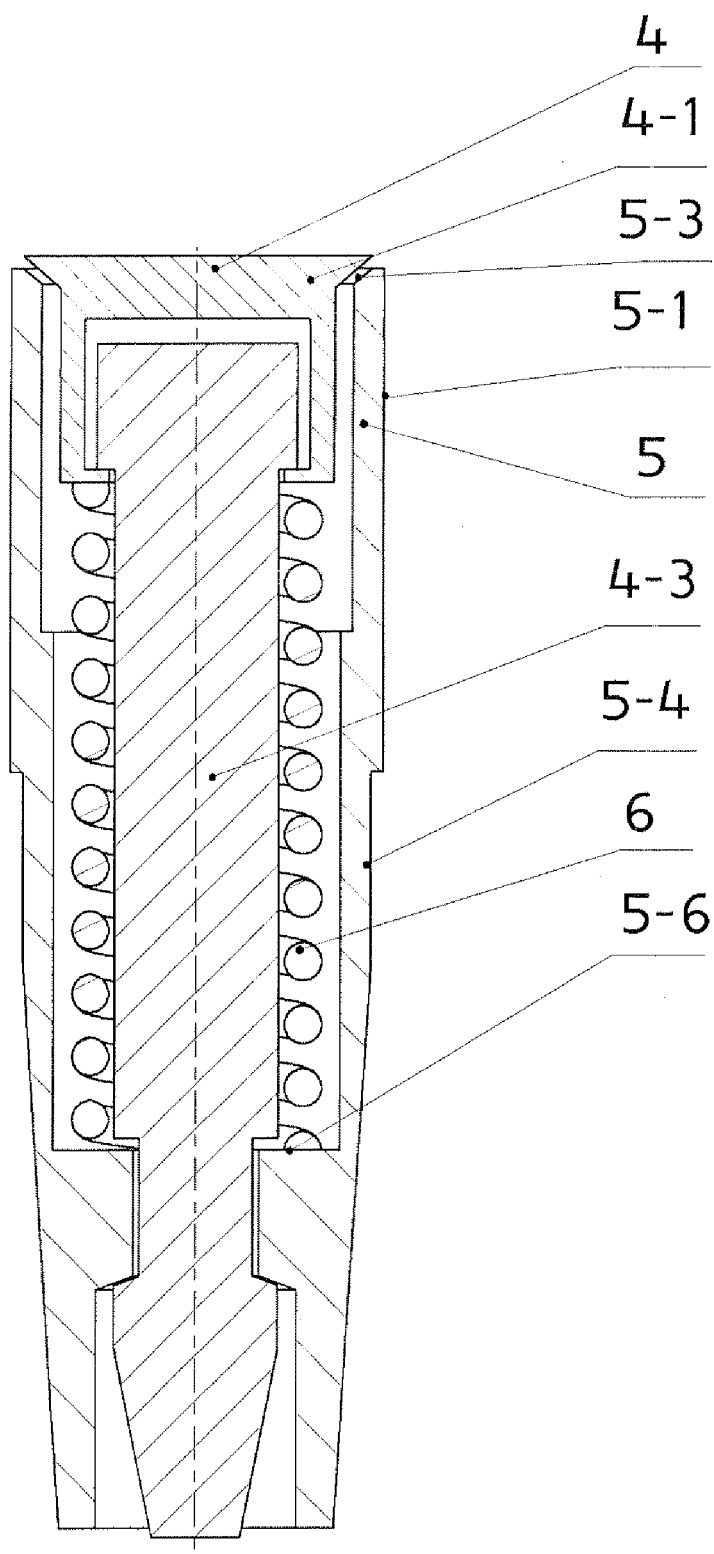
Fig. 3.1

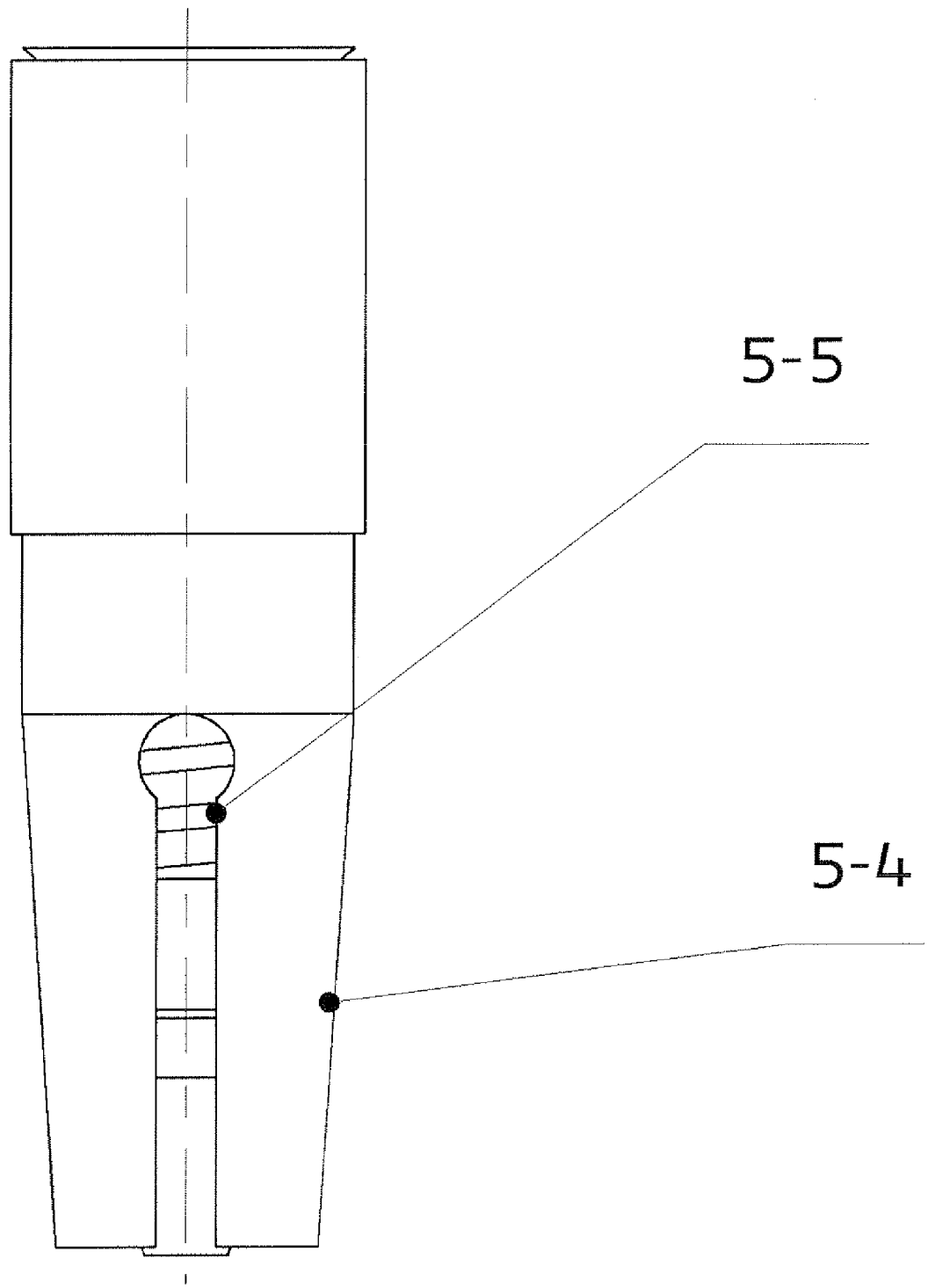
Fig. 3.2

VENTING VALVE TO BE USED IN VENTING BORES OF VULCANIZATION MOLDS

CROSS-REFERENCE TO RELATED APPLICATIONS

This application is a continuation of U.S. patent application Ser. No. 12/281,606, filed Sep. 3, 2008, now U.S. Pat. No. 7,645,131, issued Jan. 12, 2010, which is a national stage entry of PCT International application no. PCT/SK2007/050007 filed Feb. 26, 2007, which claims priority to Slovakian application Serial No. PP 0044-2006 filed Mar. 3, 2006, and which incorporates by reference the disclosure of each application identified above.

TECHNICAL FIELD

The invention concerns a vent valve to be used in venting bores of vulcanization molds for production of technical rubber products, especially for tire production. Vent valves according to the present invention are particularly suitable to be used in vulcanization molds for tire production for the tread area to prevent forming depressions or lateral flow projections.

BACKGROUND

Molds for tire vulcanization are equipped with venting bores, through which air escapes, so that semi-finished tire placed in the mold by pressure acting from the side of mold cavity can acquire the shape corresponding to the tool inserted in the vulcanization mold. This unvulcanized semi-finished product moves the air to the mold circumference, where it escapes from the mold. At the same time the tire material enters the venting bores and projecting excess rubber results, which must be removed following the vulcanization.

Insufficient removal of air from the vulcanization mold causes faults on the finished products, both depressions are formed in the tread area and the material may be insufficiently heated and thus vulcanization of the semi-finished product may be incomplete.

Vent valves and vulcanization forms equipped with vent valves are known from EP 0774 333 (CZ 291837), where the vent valve for venting bore of the vulcanization mold contains a movable valve insert with a valve shank and a disk, wherein the valve insert may be pushed into the closed position by pressure acting on that side of the disk, which is oriented to the cavity of the vulcanization mold, into which the vent valve is built-in, and vice versa, the valve insert can be moved by means of a spring into an open position, if no pressure acting from the cavity on the valve disk is present, wherein movement of the valve insert is delimited by a stop, arranged at the end of the vent valve oriented away from the cavity, for restricting the valve insert movement into the open position to a path shorter than 2 mm, wherein, for the purpose of a possibility to dismount the valve insert, the stop is realized as a snap connection provided with a clearance between the valve shank at one hand and the valve body at the other hand. Delimitation of the vent valve path is ensured by the snap lock. The snap lock is preferably located on the valve shank or it is inserted into the valve body. A disadvantage of this solution is that the vent valve consists even of four components, namely of a valve body, a valve insert, a wound spring and a flexion spring, which represents the snap lock. Disassembly of some embodiments of the vent valve according to the invention is also problematic.

The aim of the present invention is to create such vent valve, which will provide for reliable air venting of a vulcanization mold, will consist of possibly the simplest parts, will be simply assembled and disassembled and simultaneously, its price will be acceptable.

SUMMARY OF THE INVENTION

The above aim is achieved by a vent valve intended for venting bores of vulcanization molds, especially for the tread area, consisting of a valve sleeve, in which a valve insert and a wound spring are movably located, wherein the valve insert is formed by a valve shank, which is equipped at one end with a disk and at the other end with a conical surface changing into backwards oriented conical end, and the valve insert movement is delimited by a delimiter of opening the valve, the nature of which consists in that the inner surface of the valve sleeve is in its part further apart from the disk provided with conical surface, oriented away from the disk. Delimiter of the movement of the valve insert (of opening the valve) is formed by two mutually cooperating conical surfaces or parts of conical surfaces, wherein one of the conical surfaces is the above mentioned inner surface of the valve sleeve and the other conical surface is a conical surface created at the end of the valve shank of the valve insert, which is oriented against the mentioned conical surface or part of conical surface of the valve sleeve.

According to a preferred embodiment, the valve sleeve consists of a part, the outer diameter of which corresponds essentially to that of the bore of the vulcanization mold for embedding the valve, and of a part having a slightly smaller outer diameter. That part of the valve sleeve, the outer diameter of which corresponds essentially to that of the bore of the vulcanization mold for embedding the vent valve, is located more closely to the disk of the valve insert, while the disk of the valve insert extends into the inner space of the vulcanization mold. The second part of the valve sleeve, which has a smaller outer diameter than that of the bore for embedding the vent valve, is located further away from the disk of the valve insert, thus more closely to the outer space of the vulcanization mold. This part of the valve sleeve having the smaller diameter is provided with at least two longitudinal openings or notch grooves.

The valve sleeve, as described above, may be formed as a single rotational component or it may be formed by connecting, for example by pressing together, a separately produced rotational part as the part having the greater outer diameter, and a part having the smaller outer diameter produced as a drawn piece.

Each of the longitudinal openings uniformly spaced along the circumference of the part of the valve sleeve having smaller outer diameter is provided with a springy shaped projection, oriented to the inner space of the sleeve, wherein each shaped projection contains a part of a conical surface on the inner wall of the valve sleeve for cooperation with the conical surface of the valve insert.

The valve insert, formed by a shank, which is provided at one end with a disk and at the other end with a conical surface changing into backwards oriented conical end, may be produced as a single rotational component or the valve insert disk may be produced separately and afterwards detachably attached to the valve insert shank.

The vent valve consists of three basic components, namely of a valve sleeve, a valve insert and a wound spring. The valve insert may be pushed into the closed position by pressure acting on the outer side of the disk, and the movement into the open position of the valve, when no pressure is acting in the direction from the inner of the vulcanization mold, is ensured by the wound spring, acting on the lower side of the disk. The displacement range (p) is given by the difference of the lengths (h, H) wherein the length of the valve sleeve is h and the length of the valve insert is H.

The part of the valve sleeve, which is oriented to the cavity of the vulcanization mold, has greater outer diameter than the part of the valve sleeve, which is located more closely to the outer side of the vulcanization mold, and the part of the valve sleeve having smaller diameter is provided with longitudinal notch grooves or openings provided with shaped projections extending into the inner part of the sleeve. Openings or notch grooves in this part of the sleeve serve for better escape of air from the vulcanization mold and for creation of the necessary elasticity of the valve sleeve, which is needed when mounting and dismounting the vent valve into and out of the mold.

The outer surface of the part of the valve sleeve with smaller diameter (the narrower part) is formed by a conical surface or rotational surface having profile of a parabola curve.

Movements of the valve insert are delimited by a delimiter, arranged at the end of the vent valve, wherein the delimiter restricts the movement of the valve insert into the open position. Delimiter of opening the valve (displacement of the valve insert) is meant as abutment of two conical surfaces or parts of conical surfaces facing each other, wherein one of them is a part of the inner surface of the valve sleeve and the other is a part of the valve insert.

Bending of the valve sleeve when mounting and dismounting the valve insert is allowed by the notch grooves (at least 2) on the circumference of the valve sleeve mantle or deformation of the shaped projections (at least 2), containing parts of conical surface, in the longitudinal openings of the mantle, if this part has been produced as a drawn piece according to another embodiment of the present invention.

After pressing such valves into the vulcanization mold, each of the valves is pushed into the closed position by the rubber mixture of the tire semi-finished product when pressure is applied, and vice versa, each of the valves is pushed into its open position by means of a wound spring when the finished tire is removed.

For further improvement of cleanness and functionality of the cooperating elements, it is possible to furnish certain surfaces with anti-adhesive or anticorrosive layer.

As dismounting of venting valves from the mold is necessary only rarely, it is always sufficient to fix the valves in the segments of the vulcanization mold by pressing them in. For that purpose, diameter of the valve in dismounted state should always be slightly greater than the inner diameter of the respective venting bore.

An advantage of the vent valves according to the present invention is that the valve insert can be, despite the delimiter of the opening movement, easily dismantled by a force acting in the direction of the valve insert axis into the cavity of the vulcanization mold, and the valve can be easily assembled by acting of a force in the opposite direction.

BRIEF SUMMARY OF THE DRAWINGS

The attached drawings show vent valves according to the present invention in various embodiments.

FIGS. 1.1, 1.2 and 1.3 show the vent valve according to Example 1, where FIG. 1.1 shows a section through the vent valve, FIGS. 1.2 and 1.3 are the outside views of the vent valve, wherein in FIG. 1.2 the broken lines indicate the parts located inside the valve sleeve, which are not visible from outside.

FIGS. 2.1 and 2.2 show the vent valve according to Example 2, where FIG. 2.1 shows a section through the vent valve, FIG. 2.2 is the outside view of the vent valve.

FIGS. 3.1 and 3.2 show the vent valve according to Example 3, where FIG. 3.1 shows a section through the vent valve, FIG. 3.2 is the outside view of the vent valve.

DETAILED DESCRIPTION OF A PREFERRED EMBODIMENT

EXAMPLE 1

The vent valve, shown in FIG. 1.1, consists of a valve sleeve (5), which has cylindrical shape and is provided with a cavity. The outer diameter of that part (5-1) of the valve sleeve (5), which, when used in the venting bore of a vulcanization mold, is located more closely to the inner space of the mold, is essentially the same as diameter of the bore in the vulcanization mold for embedding the valve, and is greater than the outer diameter of the second part (5-4) of the sleeve (5), which is oriented outwards of the mold. This part (5-4) of the sleeve (5) having smaller outside diameter is provided with at least two longitudinally oriented notch grooves (5-5) (FIG. 1.3), running from the sleeve end to its part (5-1) having greater outer diameter. These notch grooves allow air to escape from the vulcanization mold into the space created between the cylindrical bore in the vulcanization mold and the tapered part (5-4) of the valve sleeve (5) and further away from the vulcanization mold. This space is necessary when replacing the valve insert (4). The valve insert (4) is located in the cavity of the valve sleeve (5). The valve insert is a rotational component formed by a disk (4-1), shank (4-3) and conical surface (4-2). When pressure is acting from the cavity of the vulcanization mold, disk (4-2) abuts that edge of the valve sleeve (5), which oriented inwards the vulcanization mold. This edge of the valve sleeve (5) is equipped with conical surface (5-3). The valve sleeve (5) is at its inner surface in the lower part provided with a stop surface (5-6) for the wound spring (6) and an inner conical surface (5-2), which together with the conical surface (4-2) of the valve insert (4) forms the delimiter for opening the valve.

On the shank (4-3) of the valve insert (4), there is located the wound spring (6), which ensures open position of the vent valve, if there is no pressure acting in the vulcanization mold. The wound spring (6) bears with one end against the stop surface (5-6) and with the other end against the lower part of the disk (4-1). The lower part of the disk (4-1), abutting the conical surface (5-3) of the valve sleeve (5), is provided with a corresponding conical surface. The valve insert (4) is provided with a conical surface (4-2), changing into a backwards oriented conical end, and the valve sleeve (5) is in the tapered part (5-4) provided with a facing inner conical surface (5-2), abutting the conical surface (4-2) of the valve insert (4), to prevent pushing the valve insert (4) out of the valve insert (5) by the wound spring (6), so that the delimiter of movement of the valve insert (4) is created. The inner conical surface (5-2) of the sleeve (5) is interrupted only at the positions of the longitudinal notch grooves (5-5).

The disk (4-1) of the valve insert (4) is provided with a conical surface, which, when pressure is acting on the disk (4-1) which is after building it in the vulcanization mold oriented into its inner space, can be forced against the conical surface (5-3), created in the corresponding part of the valve sleeve (5), thus closing the vent valve, and vice versa, if pressure in the inner part of the vulcanization mold acting on the disk (4-1) is released, the valve insert (4) is displaced by the wound spring (6) into the open position.

Movements of the valve insert are delimited by the valve delimiter, created by cooperation of the conical surface (4-2) of the valve insert (4), arranged at the end of the shank (4-3), which is further away from the inner space of the vulcanization mold, with the inner conical surface (5-2) of the valve sleeve (5).

Longitudinal notch grooves (5-5) allow in cooperation with the valve insert (4), the wound spring (6) and the space in the bore of the vulcanization mold for air better to escape from the inner space of the vulcanization mold and they ensure elasticity and opening (releasing) of this tapered part (5-4) of the valve sleeve (5) to facilitate the valve dismantling when replacing the valve insert (4) and spring (6). Valve insert (4), possibly with the wound spring (6), is removed from the valve sleeve (5) by knocking it out inwards the vulcanization mold.

EXAMPLE 2

The vent valve, shown in FIG. 2.1, consists of a valve sleeve (5) of cylindrical shape, which is provided with a cavity. The valve sleeve (5) is formed by tight connection, for example by pressing together two hollow cylindrical parts, namely a machined rotational body as part (5-1) having greater outer diameter, and a drawn piece (tapered part (5-4)) having at least in a part of it smaller outer diameter in comparison with the above part. Outer diameter of that part of the valve sleeve (5), which when used in the venting bore of the vulcanization mold is located more closely to the inner space of the mold, is essentially the same as diameter of the bore for embedding the vent valve of the vulcanization mold, so it has greater diameter than the outer diameter of the second part (5-4) of the valve sleeve (5), which is located closer to the outer space. This part (5-4) of the valve sleeve (5) having smaller outer diameter is provided with two longitudinal openings, while material of the sleeve wall extends into the inner space of the valve sleeve (5) and creates a shaped projection (5-7). This shaped projection (5-7) contains at the inner side the inner part of the conical surface (5-2) to cooperate with the conical surface (4-2) of the valve insert (4), thus creating the delimiter for opening the vent valve. Longitudinal openings (shown in FIG. 2.2) allow air to escape from the vulcanization mold into the space created between the cylindrical bore of the vulcanization mold and the tapered part (5-4) of the valve sleeve (5) and further away from the vulcanization mold. In the cavity of the valve sleeve (5), there is located the valve insert (4). The valve insert is a rotational component formed by the disk (4-1), shank (4-3) and conical surface (4-2). When pressure is acting from the vulcanization mold cavity, disk (4-1) abuts that edge of the valve sleeve (5), which is oriented inwards the vulcanization mold. On the shank (4-3) of the valve insert (4), there is located the wound spring (6), which ensures open position of the vent valve, if no pressure is acting inside the vulcanization mold. The wound spring (6) bears with one end against the stop surface (5-6) of the spring and with the other end against the lower part of the disk (4-1).

The function of the vent valve according to the embodiment, shown in FIGS. 2.1 and 2.2, is the same as described in Example 1 for the embodiment according to FIGS. 1.1 to 1.3.

The tapered part (5-4) of the valve sleeve is provided with two oblong openings, in which shaped projection (5-7) is created from the sleeve wall material, which projection includes a part of conical surface (5-2). Movements of the valve insert are delimited by cooperation of the conical surface (4-2), arranged at the end of the shank (4-3), which is further away from the inner space of the vulcanization mold, with parts of the conical surfaces (5-2), created on the shaped projections (5-7), created in the longitudinal openings of part (5-4) of the valve sleeve (5).

Openings, provided with the shaped projection (5-7), in the tapered part (5-4) of the valve sleeve (5) allow in cooperation with the valve insert (4), the wound spring (6) and the space in the bore of the vulcanization mold air better to escape from the inner space of the vulcanization mold and the shaped projection (5-7) ensures elasticity of this part of the valve sleeve (5) to facilitate the valve dismantling when replacing valve insert (4) and spring (6). The valve insert, possibly with the wound spring, can be removed from the valve sleeve (5) by knocking it out inwards the vulcanization mold.

EXAMPLE 3

FIG. 3.1 shows a further embodiment of the vent valve, which consists of a valve sleeve (5) of cylindrical shape, which is provided with a cavity. Outer diameter of that part (5-1) of the valve sleeve (5), which, when used in the venting bore of a vulcanization mold, is located more closely to the inner space of the mold, is essentially the same as diameter of the bore in the vulcanization mold for embedding the valve, and is greater than the outer diameter of the second part (5-4) of the sleeve (5), which is oriented outwards of the mold. This part (5-4) of the valve sleeve (5) having smaller outside diameter is provided with at least two longitudinal notch grooves (5-5) (FIG. 3.2), running from the lower (outer) end of the sleeve (5) to its part (5-1) having greater outer diameter. These notch grooves (5-5) allow air to escape from the vulcanization mold into the space created between the cylindrical bore in the vulcanization mold and the tapered part (5-4) of the valve sleeve (5) and further away from the vulcanization mold. This space is also necessary when replacing the valve insert (4).

In the cavity of the valve sleeve (5), there is located the valve insert (4). The valve insert is a rotational component, which is in this embodiment formed by the disk (4-1) as a separately produced part, attached to the upper part of the shank (4-3) and conical surface (4-2), which changes to backwards oriented conical end. When pressure is acting from the vulcanization mold cavity, disk (4-1) abuts that edge of the valve sleeve (5), which is oriented inwards the vulcanization mold. This edge of the valve sleeve (5) is equipped with inner conical surface (5-3). The valve sleeve (5) is at its inner surface in the lower part provided with a stop surface (5-6) for the wound spring (6), and an inner conical surface (5-2), which together with the conical surface (4-2) of the valve insert (4) forms the delimiter for opening the valve.

The function of the vent valve according to this embodiment is the same as already described function of the valve according to Example 1, with the difference that when opening or closing the valve, only disk (4-1) is moving, which is made as a separate part of the valve insert (4). In the open position, there is space created between the lower part of the disk and the end of the shank (4-3), wherein the height of this space corresponds to the amount of displacement p, i.e. to the valve travel. During the action of the valve, the shank (4-3) of the valve insert stays in this case at rest.

I hereby claim the following:
1. A vent valve for use with tire molds, comprising:
a valve sleeve having a first portion and a second portion and having an aperture extending there through between a first end and a second end of the valve sleeve, the first portion of the valve sleeve being insertable into a bore of a tire mold and the second portion including one or more openings extending there through with a shaped projection extending into the aperture from each of the openings;

a valve insert located within the aperture of the valve sleeve, the valve insert including a valve shank that is at one end equipped with a disk and near the other end with a surface extending at least partially radially outward relative to valve shank; and, a wound spring located within the valve sleeve about the valve insert; wherein, the vent valve further comprises a delimiter for limiting movement of the valve insert relative to the valve sleeve, the delimiter being formed by the surface near the other end of the valve shank and a surface of the shaped projection.

2. The vent valve of claim 1, wherein the valve sleeve first portion has an outer diameter that is larger than an outer diameter of the valve sleeve second portion.

3. The vent valve of claim 2, wherein the valve sleeve first portion is snugly inserted into a vent bore of a tire mold.

4. The vent valve of claim 1, wherein the wound spring normally biases the valve insert into an open position.

5. The vent valve of claim 1, wherein the valve sleeve second portion openings provide an exhaust point for pressurized air travelling through the vent valve.

6. The vent valve of claim 1, wherein the first end of the valve sleeve further comprises a conical surface that is complementary to a conical surface of the disk.

7. The vent valve of claim 5, wherein the shaped projections are sufficiently deformable to enable the valve shank to be removed from the valve sleeve.

8. The vent valve of claim 1, wherein the valve shank disk is removably attached to the remainder of the valve shank.

9. The vent valve of claim 1, wherein the outwardly extending surface at the other end of the valve shank is an at least partially conical surface, and the surface of the shaped projection forming the delimiter with the valve shank surface is also an at least partially conical surface.

10. A vent valve for use with tire molds, comprising:
a valve sleeve having a first portion and a second portion and having an aperture extending therethrough between a first end and a second end of the valve sleeve, the first portion of the valve sleeve being insertable into a bore of a tire mold and the second portion including one or more openings extending through a thickness of the sleeve, the openings having a length extending from the second end of the valve sleeve in a generally longitudinal direction of the sleeve toward the first portion;

a valve insert located within the aperture of the valve sleeve, the valve insert including a valve shank that is at one end equipped with a disk and near the other end with a surface extending at least partially radially outward relative to the valve shank; and, a wound spring located within the valve sleeve about the valve insert; wherein, the vent valve further comprises a delimiter for limiting movement of the valve insert relative to the valve sleeve, the delimiter being formed by the outwardly extending surface near the other end of the valve shank and a surface of the valve sleeve.

11. The vent valve of claim 10, wherein the valve sleeve first portion has an outer diameter that is larger than an outer diameter of the valve sleeve second portion.

12. The vent valve of claim 10, wherein the wound spring normally biases the valve insert into an open position.

13. The vent valve of claim 10, wherein the valve sleeve second portion openings form an exhaust point for pressurized air travelling through the vent valve.

14. The vent valve of claim 10, wherein the first end of the valve sleeve further comprises a conical surface that is complementary to a conical surface of the disk.

15. The vent valve of claim 10, wherein the openings provide sufficient flexibility in the second portion to enable the valve shank to selectively be removed from the valve sleeve.

16. The vent valve of claim 10, wherein the outwardly extending surface at the other end of the valve shank is an at least partially conical surface, and the surface of the valve sleeve forming the delimiter with the valve shank surface is also an at least partially conical surface.

17. The vent valve of claim 10, wherein the valve shank disk is removably attached to the remainder of the valve shank.

* * * * *